No. 619,505. Patented Feb. 14, 1899.
G. L. ROBY.
MOTOR VEHICLE.
(Application filed Dec. 31, 1896.)

(No Model.) 5 Sheets—Sheet 1.

WITNESSES
Joseph H. Weaver
John J. Garber

INVENTOR
Geo. L. Roby

No. 619,505.  
Patented Feb. 14, 1899.
G. L. ROBY.
MOTOR VEHICLE.
(Application filed Dec. 31, 1896.)
(No Model.)  
5 Sheets—Sheet 2.
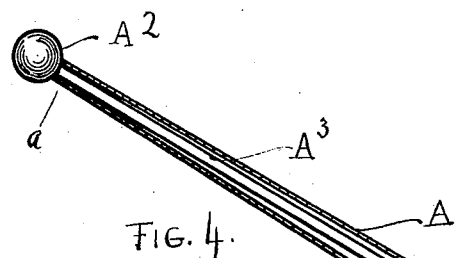
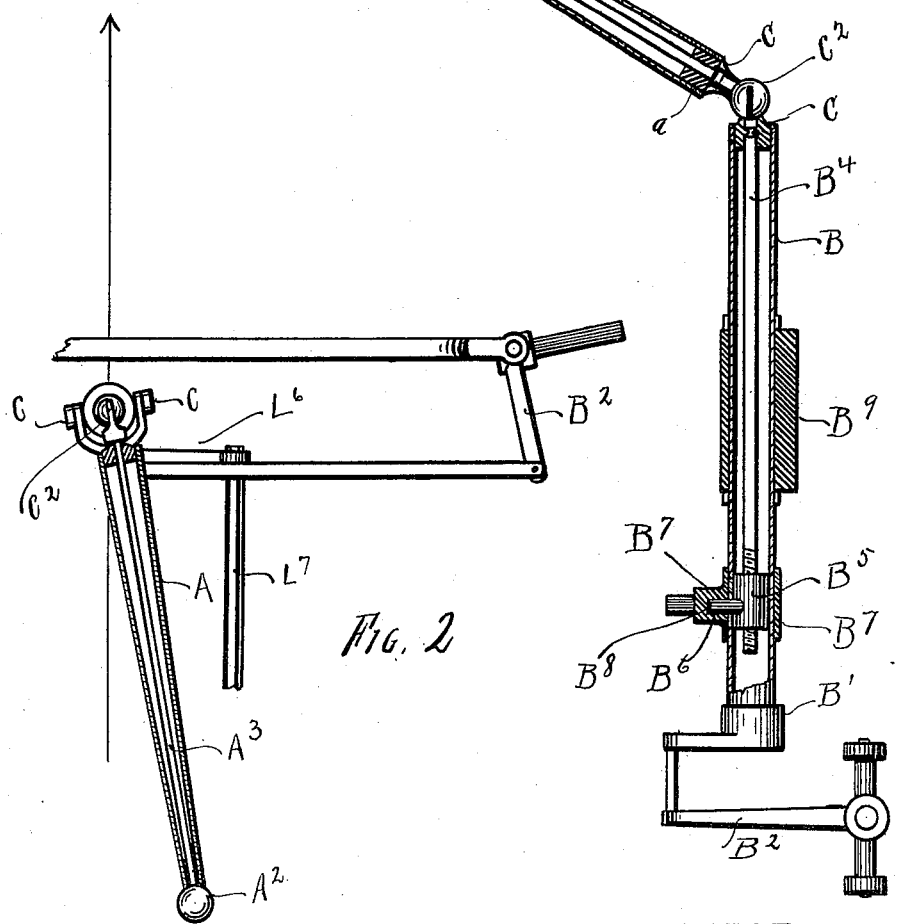
WITNESSES:  
Joseph H. Weaver  
John F. Garber
INVENTOR,  
Geo. L. Roby No. 619,505. Patented Feb. 14, 1899.
G. L. ROBY.
MOTOR VEHICLE.
(Application filed Dec. 31, 1896.)
(No Model.) 5 Sheets—Sheet 3.

WITNESSES,
Joseph H. Wemer
John T. Garber

INVENTOR
Geo. L. Roby

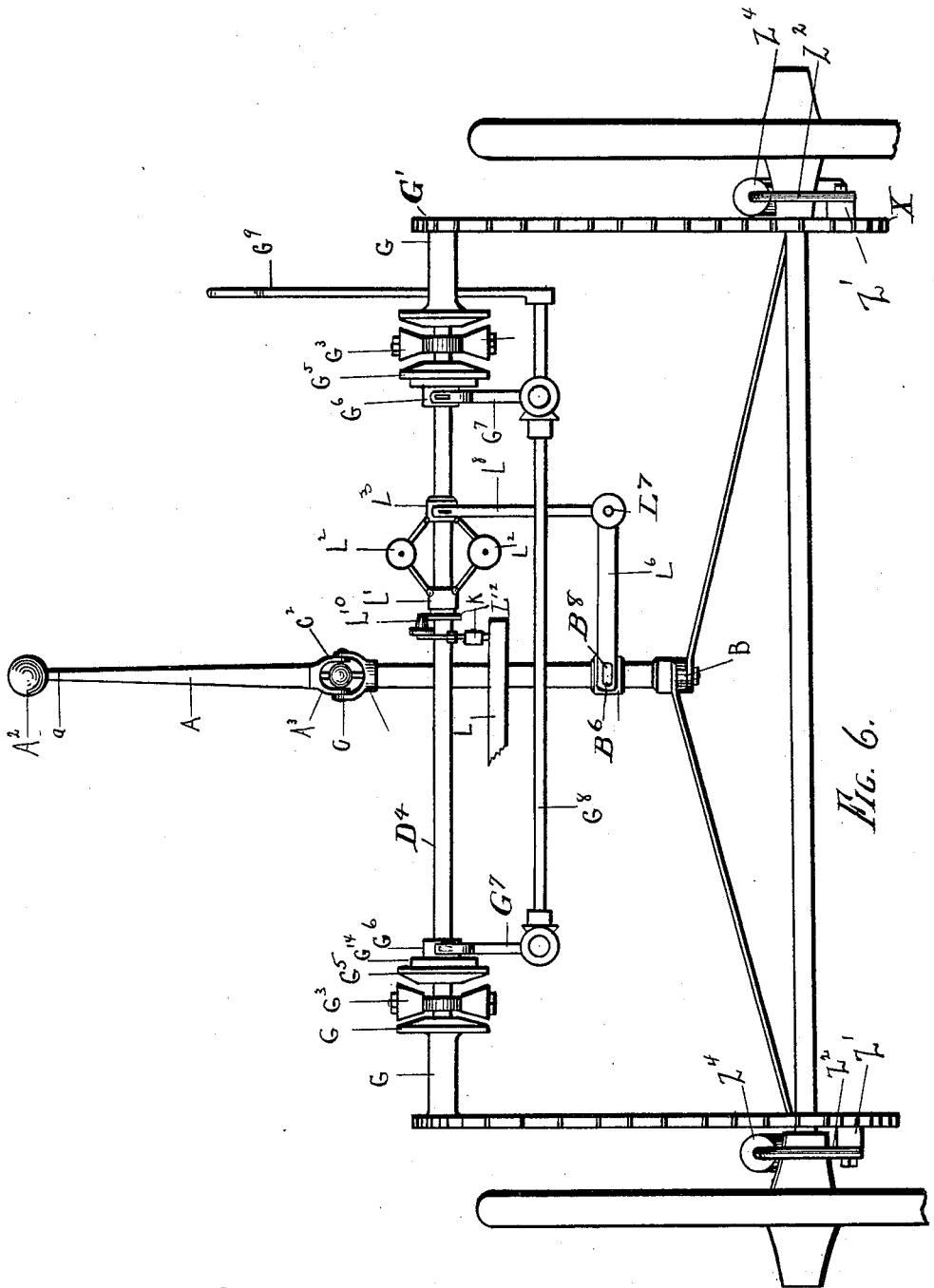

No. 619,505. Patented Feb. 14, 1899.
G. L. ROBY.
MOTOR VEHICLE.
(Application filed Dec. 31, 1896.)
(No Model.) 5 Sheets—Sheet 5.

WITNESSES
Joseph H. Weaver
John F. Garber

INVENTOR
Geo. L. Roby

UNITED STATES PATENT OFFICE.

GEORGE L. ROBY, OF ALBION, MICHIGAN.

MOTOR-VEHICLE.

SPECIFICATION forming part of Letters Patent No. 619,505, dated February 14, 1899.

Application filed December 31, 1896. Serial No. 617,664. (No model.)

*To all whom it may concern:*

Be it known that I, GEORGE L. ROBY, of Albion, Calhoun county, Michigan, have invented certain new and useful Improvements in Motor-Vehicles; and I do hereby declare the following to be a full, clear, and exact description of the invention, such as will enable others skilled in the art to which it pertains to make and use it, reference being had to the accompanying drawings, which form a part of this specification.

My invention relates especially to the control and propulsion of motor-vehicles; and it consists of a suitable handle or lever to guide the direction and speed of such vehicle and the transmission of power to the vehicle driving-wheels by suitable devices.

Figure 1:
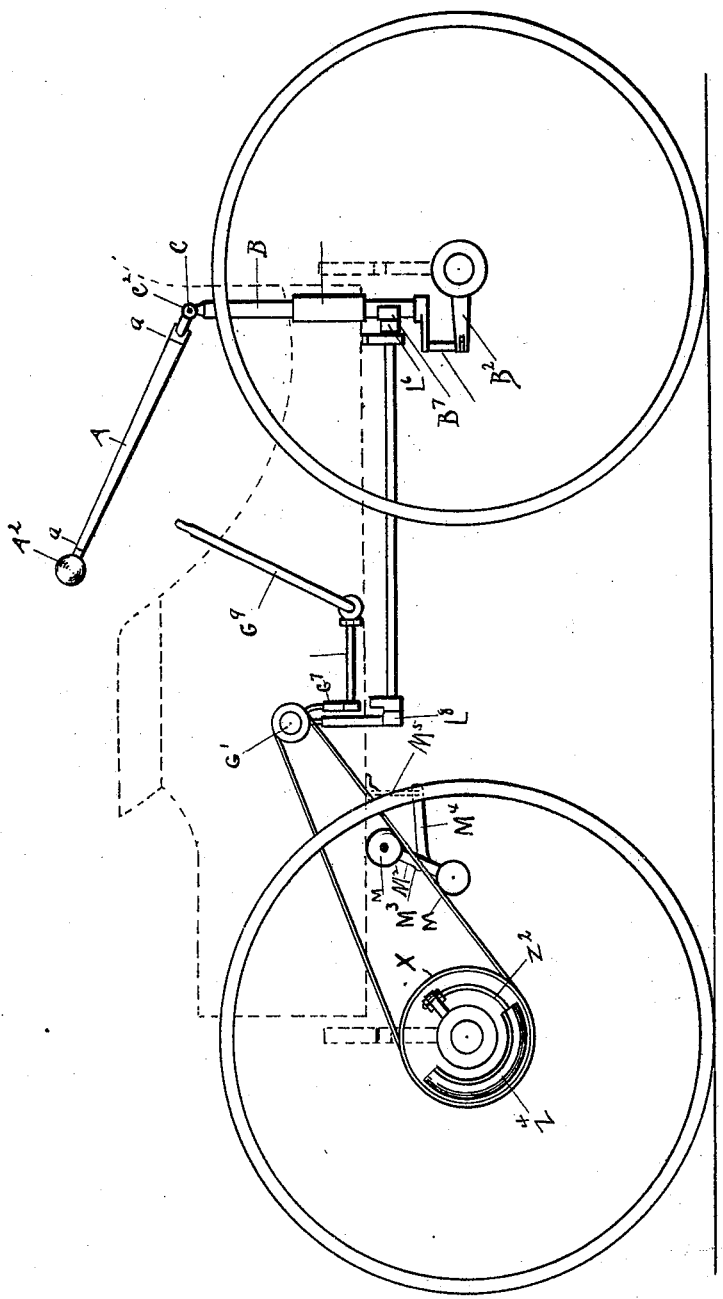
Figure 5:
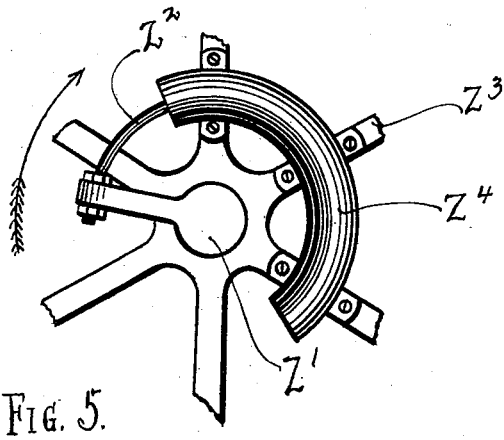
Figure 7:
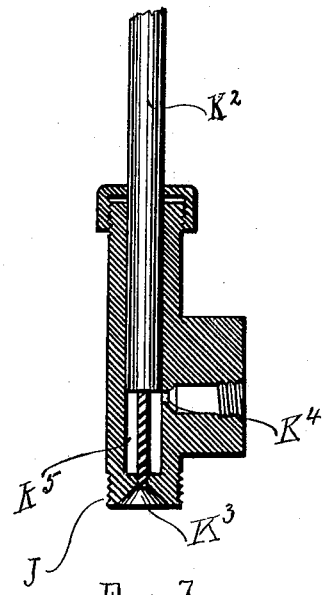
Figure 3:
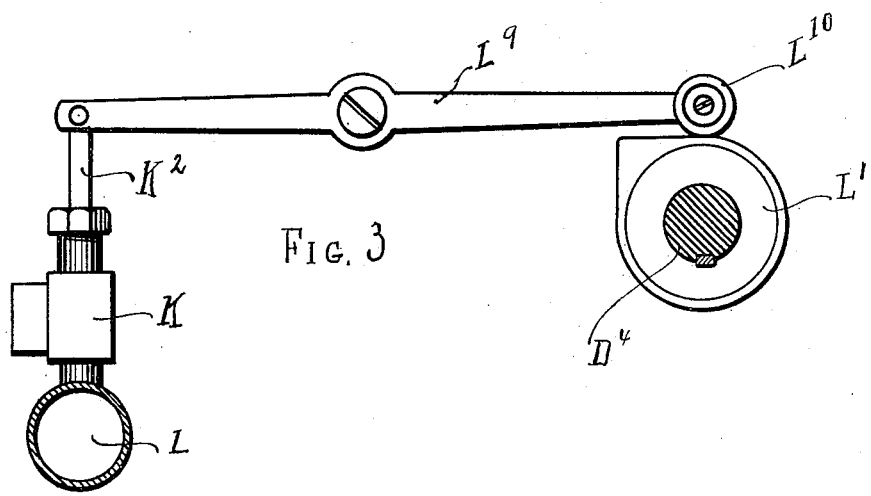
Figure 9:
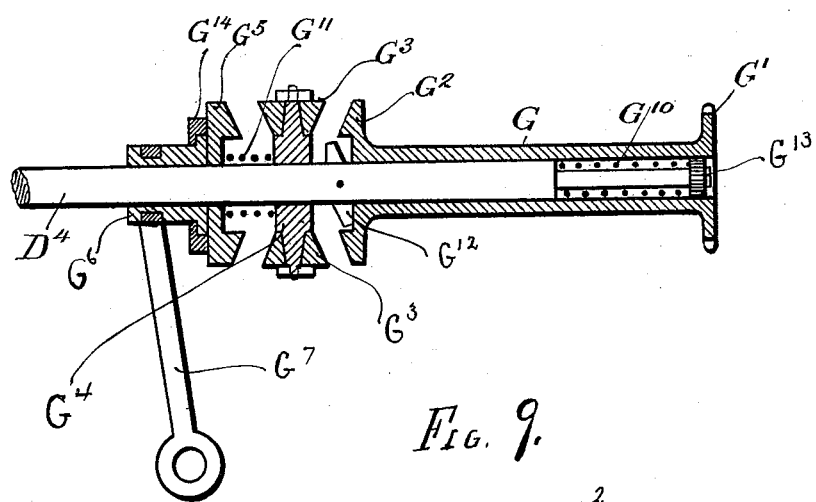
Figure 8:
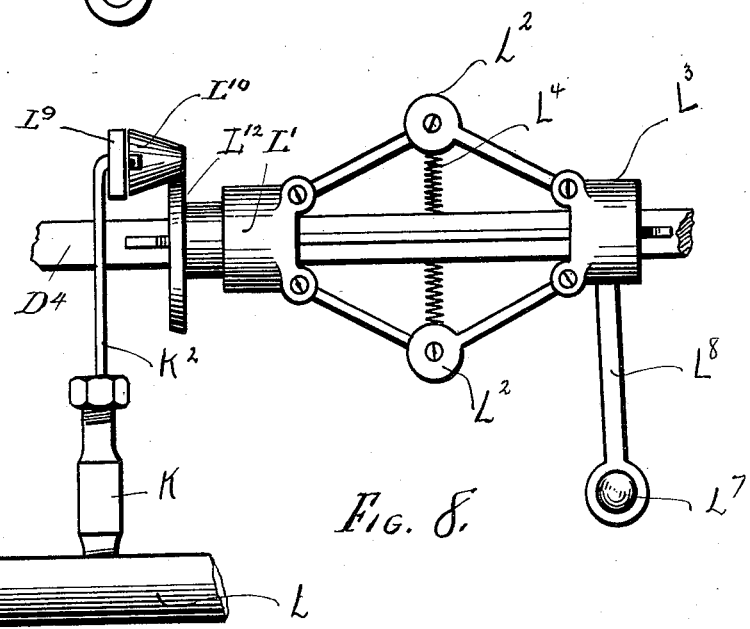

Figure 1 is a side elevation of the particular parts embodied in my invention; Fig. 2, plan view of the parts embodied in Fig. 4; Fig. 3, an elevation showing probable way of connecting the operation of the governor with the injecting-pump K; Fig. 4, a sectional view of the connection between the steering-lever and the device for regulating the speed; Fig. 5, a detail view of the air-cushion power-transmission wheel; Fig. 6, an end elevation looking from the rear; Fig. 7, a sectional view of the injecting-pump; Fig. 8, a view of the parts governing the speed of the motor, and Fig. 9 details of the reversing-gear.

A, Figs. 1 and 6, represents the lever for guiding the vehicle in the direction desired, and is flexible for the convenience of the operator, but connected to the steering-post B at C by a joint which will convey its traverse motion to the post B.

B is a tube journaled to the body of the vehicle in a suitable manner (see $B^9$) and having its upper end formed a suitable shape to connect with lever A and at lower end a crank B', to whose outer or free end connections by flexible pitmen are made to the free end of the axle-crank $B^{2'}$ in the usual manner.

The handhold $A^2$ is fastened to and made a part of a second or inner shaft passing through the lever A, journaled at $a$ $a$ and shown at $A^3$, which rotates freely in either direction. At $C^2$ the rod or shaft $A^3$ is connected by a conventional "universal joint" to $B^4$, a second or inner shaft passing through the tube B and journaled therein at its upper end. The lower end, being threaded for a considerable distance, passes through and rotates freely in the nut $B^5$, Fig. 4, which is a sliding fit for the interior of the post B. The nut $B^5$ has projecting therefrom one or more studs $B^6$, which move up and down in vertical slots cut in the post B.

$B^7$ is a piece having a loose contact with the post B and is held in that position either by passing around it or by the end of the bell-crank $L^6$ and having formed therein a traverse-slot $B^8$ of a size suitable to receive the stud $B^6$, projecting from the nut $B^5$. It will be seen that the rotation of the handhold $A^2$ will also rotate the shaft $B^4$ and cause the nut and the attached cap $B^7$ to rise and fall according to the direction in which it is turned without interfering with the motion of the post B and lever A necessary in guiding the vehicle.

From the cap $B^7$ to the collar $L^3$ there is provided a system of levers or connections to conform with the requirements of the particular vehicle to which the invention is attached; but as the requirements will vary no particular arrangement is claimed. Where possible, the crank $L^6$, shaft $L^7$, and crank $L^8$ are shown as a simple form for this connection. By means of these intermediate connections as the handhold $A^2$ is rotated the movement of the nut $B^5$ is conveyed to and changes the position of the collar $L^3$, which forms a part of the motor-governor, so that the motor will maintain a certain speed, predetermined by the rotation of the handhold $A^2$ and without reference to the amount of power it will be necessary to develop, which may be controlled by the governor in the usual manner.

L' in Fig. 6 is a collar sliding upon ways formed on the shaft of the motor, to which a cam $L^{12}$ is attached.

$L^2 L^2$ is a double pair of jointed arms heaviest at the part farthest from the attachment to the collar L' or $L^3$.

$L^3$ is a collar sliding in ways on the motor-shaft and whose position is controlled by the handhold $A^2$, as heretofore described.

$L^9$ is a pivoted arm connected at one end with a puppet-valve of a general type to admit steam into the cylinder at proper times or to a valve or pump to introduce gas or gasolene into the explosive-chamber or air-duct L of a gas-engine, if that system of power is used. On the other end of the lever or arm $L^9$ there is a projection or roller $L^{10}$, largest at the place of jointure with $L^9$ and tapering outwardly in a regular manner. If the collar $L^3$ is set at a point on the shaft $D^4$ where the force developed by the weighted arms $L^2$ $L^2$ is sufficient at any given number of revolutions to overcome the tension of the spring $L^4$, and thus to withdraw the arm or collar $L^{12}$ from contact with the arm $L^9$, no greater speed can be developed, and at any less speed than that required to miss the arm $L^9$ the cam will work suitable valves or injectors for the development of more power, and because of the tapering shape of the projection the greater the amount of vapor required to bring the speed to its proper place the greater the movement of the arm $L^9$ and the working parts thereto attached. It will be seen that by turning the handhold $A^2$ so as to lower the cap $B^7$ the collar $L^3$ will be moved nearer the arm $L^9$ and that a greater number of revolutions will be necessary to cause the cam $L'$ to miss the projection $L^{10}$, and that by rotating the handhold $A^2$ and moving the collar farther from the arm $L^9$ the cam $L^{12}$ will fail to act on the pivoted arm $L^9$ unless turning at a speed lower in proportion to the movement of the collar $L^3$.

K, Figs. 3 and 7, represents a pump for the injection of explosive liquids into the combustion-chambers of a motor or into the air-duct leading thereto. The end J, projecting therein, has the opening in its end normally closed by the valve $K^3$, which is fastened to or made a part of the piston $K^2$ and held closed by a spring or the counterweighted arm $L^9$. Pressure on the end of the piston $K^2$, communicated to it through the lever $L^9$ by the cam on the governor-shaft sufficient to move it downward, opens the valve $K^3$, and the plunger $K^2$, passing the supply-opening $K^4$, ejects the liquid in the cavity $K^5$ through the opening in the end J, between the reduced part of the plunger $K^2$ and the cylinder K, and sprays it into the air passing through the duct or into the explosion-chamber. When the pressure is removed from $K^2$, it returns to its former position, with the valve $K^3$ closed and the cavity $K^5$ in communication with the supply through the opening $K^4$, which allows it to be immediately filled with the proper liquid by forces or gravity.

G represents a power-transmitting wheel, having connection by sprocket chain or gear with the wheel X at its outer end $G'$, the inner end having a bevel face, smooth or with cogs, as desired. $G^3$ $G^3$ are two or more pinions revolving on axles attached to the sliding ring $G^4$.

$G^5$ is a bevel-wheel of the same size and kind as G at the part indicated by $G^2$ and connected to the collar $G^6$ by the ratchet $G^{14}$.

$G^6$ is a collar sliding in ways cut in the shaft $G^7$, a lever controlling the position of the collar $G^6$. ($G^8$ cross-shaft, and $G^9$ reversing-lever, suggested for the control of the lever $G^7$, but not considered essential.)

$G^{10}$ and $G^{11}$ are springs, and $G^{12}$ ratchet-dog.

$G^{13}$ is a collar or ring forming part of or attached to the shaft $D^4$, which forms a seat for the spring $G^{10}$. When the clutch-face of the sheave $G'$ is in engagement with the dog $G^{12}$ and revolving with the shaft $D^4$, but also of large enough diameter that when the clutch and sheave $G'$ have been disengaged from the dog $G^{12}$ by the outer movement of the sheave from pressure or movement of the idlers $G^3$ $G^3$ and revolving in the opposite direction, this lateral movement of $G'$ will be limited by the collar $G^{13}$ to an amount only necessary to accomplish the release of the dog $G^{12}$. $G^{14}$ is a ratchet connecting $G^5$ and $G^6$. When the collar $G^6$ is in the position shown, the tension of the spring $G^{10}$ holds the wheel $G'$ into a position where ratchet-teeth cut on the face at $G^2$ engage with the dog $G^{12}$. If the collar $G^6$ is moved until the spring $G^{11}$ pushes the ring $G^4$ until the idlers $G^3$ $G^3$ engage with the face of the wheel $G'$ at $G^2$ and slide it endwise until the stop $G^{13}$ is reached, the dog $G^{12}$ will miss the wheel $G'$, and it will stand idle, although the shaft $D^4$ continues to revolve. If the collar $G^6$ is pushed outward still farther, the spring $G^{11}$, becoming compressed, allows the wheel $G^5$ to engage with the idlers $G^3$ $G^3$ and revolves the sheave $G'$ in the opposite direction to that in which the motor is going, the ratchets $G^{12}$ and $G^{14}$ being interposed to allow for the unequal travel of the driving-wheels when moving on a curve.

If the power from $G'$ to X is conveyed thereto by chain or belt, the addition of weight to the body of the vehicle when loaded will cause the depression of the carriage-springs upon which the vehicle-body is presumably hung in the usual manner, and the points $G'$ and X will approach nearer to each other to keep the power-conveying medium running over the wheels $G'$ and X always at a proper working tension. Between these two points are located the idlers M M, turning freely on bearings provided on the arm $M^2$, which is in turn pivoted in a suitable manner at $M^3$.

$M^4$ is a second arm or connection of $M^2$; $M^5$, a pitman joining the free end of $M^4$ to the body of the vehicle, the arm $M^4$ being of a length so proportioned that the depression of the pitman $M^5$ will cause the idlers M M to revolve around the pivot $M^3$ a sufficient distance to bend a belt or chain passing over the pulleys $G'$ and X far enough out of a direct line to exactly take up or neutralize the "slack" caused by the depression of the vehicle-spring or the vertical motion of the body in its relation to the wheels. When drawn in the usual manner, the give of the flesh and stretch of the leather in the harness make the power applied to vehicles elastic.

In vehicles heretofore propelled by a powerful mechanical motor of any kind the connection between the motor-power and the vehicle-wheels has been positive and nonelastic. Pneumatic tires have been resorted to to lessen the excessive vibration caused by the impact of the hard tires against an equally hard obstruction. In my invention I arrange for an elastic application of the power of the motor to the driving-wheels of the vehicle, which by giving the vehicle a slower motion when passing over obstructions allows its average speed to be increased with safety and without inconvenience to its occupants, and in case the driving-wheels meet with a sudden resistance, like running into a rut or over a stone, the shock or jar is not communicated instantly and with its full force to the motor, but allows the reduction of the speed of the vehicle in proportion to the size of the obstruction without affecting the speed of the motor, the gradual application of the load to the motor by this means allowing and giving time for it to develop its maximum strength before being stopped by any obstruction, when otherwise the motor might be caught unprepared and instantly stopped. In securing this result I employ a metal cylinder so constructed that it may be tightly closed at one end and has fitted thereto a piston so constructed that the air in the cylinder cannot escape when the piston is forced toward the closed end. The power of the motor being applied to either cylinder or piston as preferred and the resistance of the vehicle to the part opposite to that to which the power of the motor is applied will compress the air so contained until its density will equal in expansive force the power necessary to the forward movement of the vehicle. As the power necessary to drive the vehicle will constantly vary it is not to be supposed that the piston will rest stationary in the cylinder for any considerable length of time, but will travel back and forth therein in sympathy with the resistance offered to the driving or traction wheels of the vehicle. It will not be essential as to what particular form I construct this cylinder, so long as the parts mechanically connected to the motive force can move freely in relation to the parts connected to the resistance, except as prevented by the cushion of air heretofore described. I may use a straight cylinder and connect the piston to work properly by interposing equalizing levers or gears; but the most simple form would be to use the curved cylinder shown in Fig. 5, in which the cylinder $z^4$ is fastened to the wheel or disk $z^3$, receiving power from the motor and the piston $z^2$ to the hub or adjoining disk $z'$, connected mechanically with the vehicle traction-wheels. The power from the motor moving the wheels $z^3$ in the direction indicated by the arrow will compress the air contained between its closed end and the stationary piston $z^2$ until the air between them has been compressed to an amount sufficient to drive the vehicle forward or stop the motor without further mechanical connections between the moving parts of the two.

I claim—

1. The regulation of the speed and direction of a vehicle by the combination of a post journaled to its body, having a secondary shaft journaled therein passing through a splined or sliding nut, with a controlling-lever composed of two or more parts, the rotation of which will cause the rotation of the secondary shaft attached to the said post, and the lateral movement thereof causing a partial rotation of said post substantially as described.

2. In a vehicle whose direction is controlled by the partial rotation of a standard connected to the guiding-wheels, and its speed by a pin projecting therefrom, the combination of a member fitting the surface of said standard with a traverse slot cut therein to engage with, but allow the free movement of the pin in guiding the vehicle and connected to a lever, so attached to the motor thereof as to vary its driving power by the vertical movement of the pin, substantially as specified.

3. In a motor-propelled vehicle, the control of its speed by the combination of two collars sliding in suitable guides upon the main or auxiliary shaft of the motor which are connected by flexible arms to each other, one of said collars being attached to the speed-regulating lever thereof, and the other to a cam, capable by its adjustment of giving a variable movement to a lever connected to the piston of a pump injecting explosive liquid into the air-duct of the motor, substantially as described.

4. In a motor-propelled vehicle, the combination of a cam-actuated piston, having differential sizes, with a pump-cylinder having differential cavities, and an opening connected with a supply to fill said cavities by outside force or gravity, so adjusted that when the opening connecting with the liquid-supply is open, that the bottom of the cylinder is closed by the piston, and that when the opening connecting with the liquid-supply is closed by the piston, that connecting with the air-duct is opened substantially as described.

5. In a vehicle-reversing gear, the combination of a wheel held into engagement with a clutch or dog on the shaft by a spring interposed between a part thereof and a projection on the said shaft, a sliding ring carrying two or more idlers, a spring interposed between said ring and a second gear splined to the said shaft, and operated by a lever connected substantially as described.

6. In a vehicle having a drive-wheel attached to the body, and a corresponding driven wheel on the running-gear, the combination of the idlers M, M, arm $M^2$, pivot $M^3$, arm $M^4$ and pitman $M^5$, substantially as described.

7. In a vehicle power-transmission system, the interposition between the motor and the driving-wheels thereof, which are so constructed that they would otherwise be free to move in their relations to each other to a considerable distance, of an elastic cushion of air or other gaseous substances by confining it in tightly-closed cylinders at varying densities, substantially as described.

In witness whereof I have affixed my signature in the presence of two witnesses.

GEORGE L. ROBY.

Witnesses:
E. B. FOLLETT,
O. A. LEONARD.